US008754545B2

(12) United States Patent
Wai et al.

(10) Patent No.: US 8,754,545 B2
(45) Date of Patent: Jun. 17, 2014

(54) HIGH EFFICIENCY BACKUP-POWER CIRCUITS FOR SWITCH-MODE POWER SUPPLIES

(75) Inventors: Peter Wai, Corvallis, OR (US); Robert Puckette, Corvallis, OR (US)

(73) Assignee: Trimble Navigation Limited, Sunnyvale, CA (US)

( * ) Notice: Subject to any disclaimer, the term of this patent is extended or adjusted under 35 U.S.C. 154(b) by 826 days.

(21) Appl. No.: 12/765,792

(22) Filed: Apr. 22, 2010

(65) Prior Publication Data

US 2011/0260539 A1    Oct. 27, 2011

(51) Int. Cl.
*H02J 1/00*    (2006.01)
(52) U.S. Cl.
USPC .......................................................... 307/66
(58) Field of Classification Search
USPC ..................................... 307/46, 66
See application file for complete search history.

(56) References Cited

U.S. PATENT DOCUMENTS

| | | | |
|---|---|---|---|
| 5,572,108 A | 11/1996 | Windes | |
| 5,642,027 A | 6/1997 | Windes | |
| 6,188,274 B1 | 2/2001 | Vernon | |
| 6,310,789 B1 | 10/2001 | Nebrigic et al. | |
| 6,639,328 B2 | 10/2003 | Wacknov | |
| 6,787,933 B2 | 9/2004 | Claude et al. | |
| 6,812,586 B2 | 11/2004 | Wacknov et al. | |
| 7,402,921 B2 * | 7/2008 | Ingemi et al. | 307/64 |
| 2001/0033501 A1 | 10/2001 | Nebrigic | |
| 2002/0175522 A1 | 11/2002 | Wacknov et al. | |
| 2002/0195821 A1 | 12/2002 | Wacknov | |
| 2003/0015873 A1 | 1/2003 | Khalizadeh et al. | |
| 2006/0249320 A1 | 11/2006 | Carter et al. | |
| 2008/0066979 A1 | 3/2008 | Carter et al. | |
| 2010/0133912 A1 * | 6/2010 | King et al. | 307/82 |

FOREIGN PATENT DOCUMENTS

WO    WO 2008/036087 A1    3/2008

OTHER PUBLICATIONS

Joseph Witts, "Cal Poly SuPER System Photovoltaic Array Universal DC-dc Step Down Converter," Master Thesis, Jun. 2008, California Polytechnic State University, San Luis Obispo, CA, USA, pp. 1-156.

* cited by examiner

*Primary Examiner* — Daniel Cavallari
(74) *Attorney, Agent, or Firm* — Kilpatrick Townsend & Stockton LLP

(57) ABSTRACT

Disclosed are novel interconnections of a coupling circuit and an energy storage device which enables the storage device to provide back-up power for a switching power supply without requiring the device to store or output high voltage, and which enables full utilization of the energy stored in the device. In exemplary embodiments, the combination of the coupling circuit and the energy storage device may be coupled between the input and output of the switching power supply (e.g., between the non-ground terminals of the input and output ports of the switching power supply). The coupling circuit is configured to couple power from the energy storage device to the input of the switching power supply when the input power source is not provided to the switching power supply, and optionally to couple power from the input power source to the energy storage device when the input power source is provided.

33 Claims, 5 Drawing Sheets

HIGH EFFICIENCY BACKUP-POWER CIRCUITS FOR SWITCH-MODE POWER SUPPLIES

CROSS-REFERENCES TO RELATED APPLICATIONS

NOT APPLICABLE

BACKGROUND OF THE INVENTION

The present invention relates to power supplies, and more particularly to power supplies that can operate continuously despite interruptions of the input power source.

Conventional switching power supplies convert input power having a first voltage level and a first format (e.g., AC, DC) to output power having a second voltage level and a second format, where the voltage levels and/or the formats are different. The major components employed in these circuits include input and output capacitors, switches, a temporary energy storage element, and a control circuit that senses attributes of the output (such as voltage and/or current) and regulates the operation of the switches based on that feedback. The switch is not a mechanical switch that commonly comes to mind, but electronic devices (such as a bipolar transistor, MOSFET, and diode), that operate at a high frequency upward in the kilohertz or megahertz range or beyond. The energy storage element is usually an inductor or transformer, but a capacitor may be used as well. One or more large capacitors (electrolytic, ceramic, or tantalum) are put in parallel with the input to smooth out the input voltage level that could otherwise have high ripple due to its relatively long distance from the actual power source (e.g., battery and AC mains) and to maintain input level during brief interruptions of the input power. One or more large capacitors are placed in parallel with the output to prevent it from drooping between cycles of the switch's operation and to minimize the output ripple by attenuating harmonics generated from the switching process. A switching power supply may be an isolated type, in which case the grounds for the input and output of the switching power supply are isolated from one another and can take on different values of potential. A transformer is usually used to achieve the isolation. A switching power supply may also be a non-isolated type, in which case the grounds for the input and output of the switching power supply are coupled together as a common ground. A non-isolated switching power supply may be of an inverting type, in which case the voltage of the supply's output is negative while the voltage of the supply's input is positive, or vice versa. A non-isolated switching power supply may also be of a non-inverting type, in which case the voltages of the supply's input and output have the same orientation (e.g., both are positive, or both are negative). A switching power supply may also be a quasi-isolated type, in which case the grounds for the input and output of the switching power supply are allowed to have different values but the potential difference between the grounds is maintained to a selected value by a keeper circuit. A quasi-isolated switching power supply may be of an inverting type or of a non-inverting type.

An AC-to-DC switching power supply is commonly used in a personal computer to convert the AC input mains to a DC output voltage level of 12V and/or 5V. A DC-to-DC switching power supply is commonly used on computer's motherboard to provide the board with a 3.3V and other supplies from the 12V and 5V output port of the AC-to-DC switching power supply. Also, DC-to-DC switching power supplies are also commonly used in battery-powered portable devices, such as music players, personal data assistants (PDAs), cell phones, and GPS navigation equipment. As batteries are typically stable until their end of life, there is no need to couple a large capacitor in parallel with the input port of a battery-powered switching power supply.

BRIEF SUMMARY OF THE INVENTION

As part of making their invention, the inventors have recognized that it would be advantageous to enable some types of battery-power devices to continue to operate while their batteries are being removed and replaced with new batteries, or while their automotive input supplies are being switched between battery and alternator supplies. However, connecting an electrolytic capacitor of reasonable size in parallel with the input port of the switching power supply (and the battery) would not provide sufficient backup time to replace a battery without interrupting the operation of the supply. As also part of making their invention, the inventors have recognized that a super-capacitor (also called an ultra-capacitor) could provide sufficient energy storage for the above back-up purpose, but such capacitors have relatively low breakdown voltages (e.g., 5V or less, typically 2.7V) that prevent them from being coupled in parallel with the input port of the supply, which may typically be fed by a 12V battery. While super-capacitors may be coupled in series to increase the overall maximum voltage rating, such coupling requires an auxiliary charge balancing circuit to prevent any one super-capacitor from receiving excess voltage.

As part of making their invention, the inventors have discovered a novel interconnection of a coupling circuit and an energy storage device, which may comprise a capacitor or a battery, which extends the effective discharge time of the energy storage device and thus enables a smaller energy storage device to be used to provide back-up power for a switching power supply without exposing the energy storage device to excess voltage and/or requiring the energy storage device to provide the same amount of voltage as provided by the input power source. The combination of the coupling circuit and the energy storage device may be coupled between the input of the switching power supply and the output of the switching power supply or an internal node of the switching power supply. The coupling circuit is configured to couple power from the energy storage device to the input of the switching power supply when the input power source is not provided. Additionally, when the energy storage device is rechargeable, such as when it comprises a capacitor and/or battery, the coupling circuit is further configured to couple power from the input power source to the energy storage device when the input power source is provided to the switching power supply. The coupling circuit may comprise a direct electrical connection between the power input and the energy storage device, a resistor, a diode network coupled between the power input and the energy storage device, a linear regulator IC with a reverse discharge path (built into the pass transistor within the IC or an external diode) coupled between the power input and the energy storage device, combinations thereof, or other circuits that provide the above actions. For non-inverting switching power supplies of the non-isolated and quasi-isolated types, the potential of the supply's input is typically closer to the potential of the supply's output than to the potentials of the ground lines for the supply's input and output. Thus, the potential difference across the energy storage device is reduced in comparison to the case where the energy storage device is coupled between the supply's input and ground line; and yet the energy storage device is configured to provide a sufficiently high voltage to power the switching power supply.

One exemplary embodiment of the invention is directed to a power supply comprising an input port to receive a source of input power, the input port having a first terminal and a second terminal, an output port to provide output power, the output port having a first terminal and a second terminal, a switching power supply, a selected circuit node, and a circuit combination of an energy storage device and a coupling circuit. The switching power supply has an input coupled to the input port to receive input power, and an output coupled to the output port to provide output power. The selected circuit node, which may be a terminal of the output port or a circuit node of the switching power supply, has a potential. When input power is provided to the input port, the potential difference between the first terminal of the input port and the selected circuit node has the same polarity as the potential difference between the first and second terminals of the input port, but is less in magnitude. The circuit combination of the coupling circuit and the energy storage device is coupled between the first terminal of the input port and the selected circuit node, and is configured to couple energy from the energy storage element to the input of the switching power supply when input power is not provided at the input port. When the energy storage device comprises a rechargeable device, such as a capacitor and/or rechargeable battery, the circuit combination may be further configured to couple energy from the input port to the energy storage device when input power is provided at the input port.

Another exemplary embodiment of the invention is directed to power supply comprising an input port to receive a source of input power, the input port having a first terminal and a second terminal, an output port to provide output power, the output port having a first terminal and a second terminal, a switching power supply, and a circuit combination of an energy storage device and a coupling circuit. The switching power supply has an input coupled to the input port to receive input power, and an output coupled to the output port to provide output power. The switching power supply provides a common connection between the second terminal of the input port and the second terminal of the output port. The circuit combination of the coupling circuit and the energy storage device is coupled between the first terminal of the input port and the first terminal of the output port, and is configured to couple energy from the energy storage device to the input of the switching power supply when input power is not provided at the input port. When the energy storage device comprises a rechargeable device, such as a capacitor and/or rechargeable battery, the circuit combination may be further configured to couple energy from the input port to the energy storage device when input power is provided at the input port.

Further details regarding embodiments of the invention are provided below in the Detailed Description with reference to the Figures.

DETAILED DESCRIPTION OF THE INVENTION

Figure 1:
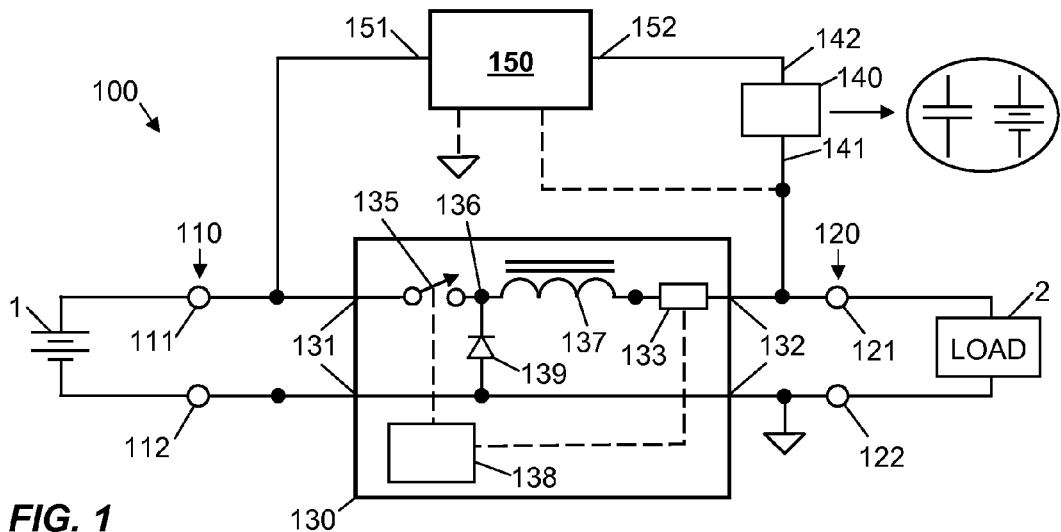
FIG. 1 shows an exemplary power supply according to the present invention.

FIG. 1 shows an exemplary power supply 100 according to the present invention. Supply 100 comprises an input port 110 to receive a source of input power, an output port 120 to provide a source of output power to a load 2, a switching power supply 130, an energy storage device 140, and a coupling circuit 150. Coupling circuit 150 is coupled to energy storage device 140, switching power supply 130, and input port 110. Input port 110 has a first terminal 111 and a second terminal 112, and output port 120 has a first terminal 121 and a second terminal 122. Switching power supply 130 has an input 131 coupled to input port 110 to receive input power, an output 132 coupled to the output port 120 to provide output power, at least one switch 135, and at least one energy storage element 137. Normally, input and output capacitors would be placed at 131 and 132 respectively to improve the operation of the switching power supply 130. But because they are not germane to the description of this invention and for the sake of simplicity, they have been left out of the drawings. Switching power supply 130 repeatedly switches switch 135 between a conducting state and non-conducting state when power is provided to its input, repeatedly transfers energy from input port 110 into element 137, and repeatedly discharges energy from element 137 to output port 120. Energy storage element 137 may comprise an inductor (as shown in FIG. 1) or a capacitor. For the purposes of illustration and without loss of generality, switching power supply 130 is illustrated as a buck converter having a switch 135, switching node 136, a freewheeling diode 139, and a controller 138. Switch 135 and diode 139 (which technically operates like a switch too) are coupled in series at switching node 136, and the series combination is coupled in parallel with input port 110. Energy storage element 137 and diode 139 are coupled in series at switching node 136, and the series combination is coupled in parallel with output port 120. Switch 135 may comprise a transistor device, such as a MOSFET device, and controller 138 may provide a control signal to the modulation terminal (e.g., gate, base) of switch 135. Since device 139 behaves like a switch, it is not uncommon for it to be implemented with a transistor also controlled by controller 138. The control signal may comprise a pulse signal with a fixed duty cycle, or a pulse-width modulated signal with a variable duty cycle. Controller 138 may sample the voltage at output port 120 and may vary the duty cycle of the control signal in relation to the sampled voltage. Also, using a current-sensing element 133 coupled in series with the output current loop, controller 138 may sample the output current and use it in its generation of the control signal. Various constructions for controller 138 are well known to the art, and the particular construction of controller 138 is not part of the present invention.

Switching node 136 constitutes a circuit node of switching power supply 130, as does the connection of the anode of diode 139 to the common ground between terminals 112 and 122. The node between energy storage element 137 and current-sensing element 133 also constitutes a circuit node of switching power supply 130. Also, two circuit nodes couple the input 131 of supply 130 coupled to input port 110, and two circuit nodes couple the output 132 of supply 130 to the output port 120.

There are many possible implementations of power supply 100 and the present invention. In some, but not all, of these possible implementations, switching power supply 130 is coupled to input port 110 and output port 120 such that, when power is provided to the input of switching power supply 130, the potential difference between first terminal 111 of input port 110 and first terminal 121 of output port 120 is less than the potential difference between first terminal 111 of input port 110 and second terminal 122 of output port 120. In other words, in these particular implementations, switching power supply 130 is coupled so that the potential at input terminal 111 is closer in value to the potential at output terminal 121 than it is to the potential at output terminal 122. In one such exemplary implementation, as illustrated in FIG. 1, the positive terminal of a battery 1 is coupled to the input port's first terminal 111, the negative terminal of battery 1 is coupled to the input port's second terminal 112, the ports' second terminals 112 and 122 are coupled together as common ground for the ports, and the positive voltage of output port 120 is provided at its first terminal 121. This implementation of supply 130 comprises a non-isolated, non-inverting switching power supply.

Energy storage device 140 has a first terminal 141 and a second terminal 142, and may comprise a capacitor, a battery, or a combination thereof. The battery may be a rechargeable type (e.g., NiCad, Li-ion, nickel-metal hydride, etc.), or a non-rechargeable type (e.g., alkaline). These are examples of charge storage devices. Coupling circuit 150 has a first terminal 151 and a second terminal 152, with the second terminal 152 of coupling circuit 150 being coupled to the second terminal 142 of energy storage device 140 to form a circuit combination. In some implementations of coupling circuit 150, as described below, coupling circuit 150 may comprise a third terminal coupled to the first terminal 141 of energy storage device 140, and a forth terminal coupled to one or both of second terminals 112 and 122 of the input and output ports. The circuit combination of energy storage device 140 and coupling circuit 150 is coupled between the first terminal 111 of the input port and a selected circuit node. The selected circuit node is selected according to the following criterion: the potential difference between input port's first terminal 111 and the selected circuit node is smaller than, but with the same polarity as, the potential difference between the input port's first and second terminals 111 and 112, respectively. The selected circuit node may comprise one of the terminals of output port 120 or a circuit node of switching power supply 130, such as an output node of supply 130 or an internal node of supply 130, such as the circuit node between elements 133 and 137. For the above-described embodiment, terminal 121 is one such selected circuit node since the potential difference between input terminal 111 and that location is smaller than, and has the same polarity as, the potential difference between input terminals 111 and 112. The circuit node between elements 133 and 137 can also serve as the selected circuit node. FIG. 1 shows an implementation where the selected circuit node is terminal 121, with the first terminal 141 of energy storage device 140 being coupled to the selected circuit node and the first terminal 151 of coupling circuit 150 being coupled to the first terminal 111 of the input port 110. It may be appreciated that, as in another implementation, the first terminal 151 of coupling circuit 150 may be coupled to the selected circuit node and that the first terminal 141 of energy storage device 140 may be coupled to the first terminal 111 of the input port 110. This implementation is shown at 100" in FIG. 11.

Figure 2:
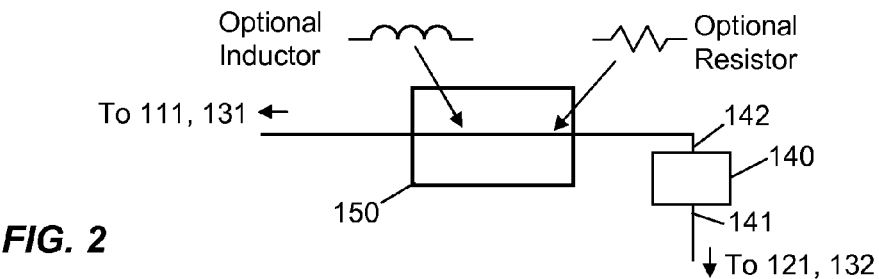
FIGS. 2-5 show exemplary coupling circuits according to the present invention.
Figure 3:
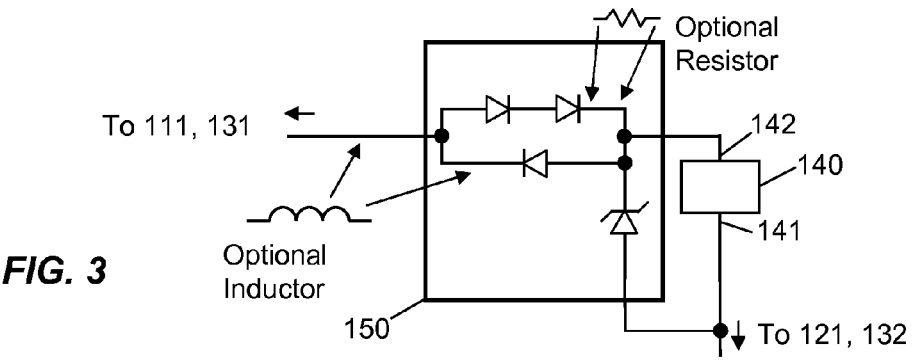
Figure 4:
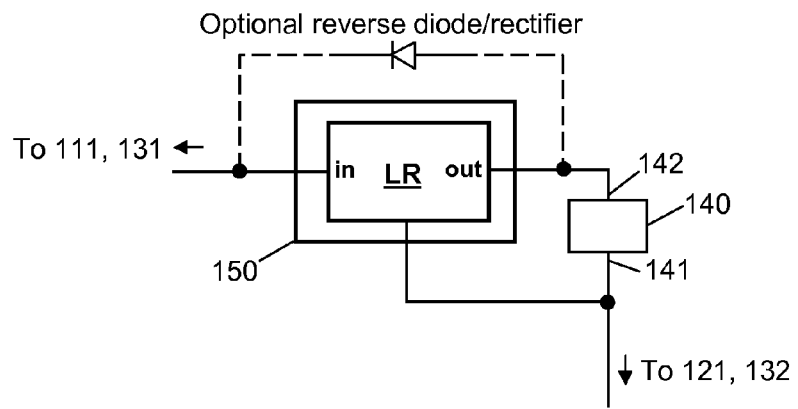

Coupling circuit 150 is configured to couple power from energy storage device 140 to input 131 of switching power supply 130 when power is not provided at input port 110. In implementations where energy storage device 140 comprises a capacitor and/or a rechargeable battery, coupling circuit 150 is further configured to couple power from the input power source to the energy storage device when power is provided at input port 110. Coupling circuit 150 may comprise a direct electrical connection (e.g., wire connection) between terminals 111 and 142 (as shown in FIG. 2), diode network coupled between terminals 111 and 142 (as shown in FIG. 3 as a bi-directional conducting diode network), a linear regulator LR with a reverse discharge path (as shown in FIG. 4), or other circuits that provide the above actions. Many linear regulators are implemented with output PMOS transistors that can act as the discharge path because they become highly conductive when input power is not provided to the regulator. An exemplary linear regulator that may be used in FIG. 4 is the TPS71550 manufactured by Texas Instruments. Linear regulator implementations of coupling circuit 150 typically have the third terminal coupled to the first terminal 141 of energy storage device 140, and may also have a forth terminal coupled to one or both of second terminals 112 and 122 of the input and output ports (such as to obtain a ground potential).

Figure 5:
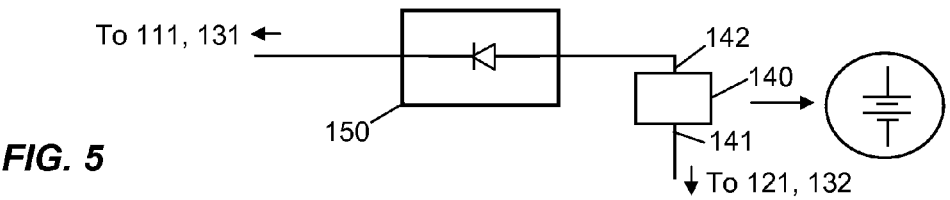

FIGS. 2-5 show various exemplary implementations of coupling circuit 150. With the implementation of circuit 150 shown in FIG. 2, energy storage device 140 is charged with a potential different equal to the difference between the input and output voltages of switching power supply 130. A resistor may be coupled in series with the wire connection to limit the inrush current to energy storage device 140 when battery 1 is initially coupled to supply 100. Also, an inductor may be used. With the implementation of coupling circuit 150 shown in FIG. 3, energy storage device 140 is charged with a potential difference equal to the difference between the input and output voltages of switching power supply 130, minus two diode voltage drops, and up to the limit of the Zener diode. This implementation may be used if the potential difference between the input and output of supply 130 exceeds the maximum voltage rating of energy storage device 140. Additional diodes may be placed in the upper path to further lower the potential across energy storage device 140, if needed, and a resistor may be added to the upper path to limit the current to the Zener diode and energy storage device 140. Also, an inductor may be used, and can be useful to bridge across differences in voltages when a switch power supply 130 comprises a switch-capacitor converter (described below). As such, coupling circuit 150 maintains a voltage drop across itself when power is provided to input port 110; this voltage drop may be 1 volt or more. Only one diode is included in the lower path so as to maximize the delivery of power from energy storage device 140 to switching power supply 130. This diode may comprise a Schottky barrier diode, or other types of devices (such as MOSFET with appropriate gate control) with a low forward voltage drop. While FIG. 3 may not be the most practical of possible circuit implementations, it illustrates conceptually what a coupling circuit does, i.e., limit the voltage of and provide a discharge path for energy storage device 140. With the implementation of coupling circuit 150 shown in FIG. 4, energy storage device 140 is charged to a selectable value as determined by the configuration of the linear regulator LR. Linear regulator LR compares the voltage across energy storage device 140 to a reference voltage, and regulates the current flow from input port 110 to energy storage device 140 in order to maintain the voltage across energy storage device 140 to a value set by the reference. In many linear regulators, the reference is adjustable. Thus, this configuration enables the voltage across energy storage device 140 to be set very close to the energy storage device's maximum voltage rating, thereby maximizing the energy stored in the energy storage device. Typical linear regulators are configured to provide a discharge path from their outputs back to their inputs when power is removed from their inputs. This discharge path may be provided by a PMOS transistor (as mentioned above), which can have a very low voltage drop during discharge. If the linear regulator does not have a discharge path, a reverse diode/rectifier may be coupled in parallel with the linear regulator, like the lower path shown in FIG. 3 (e.g., the reverse diode may be coupled between the second terminal 142 of energy storage device 140 and first terminal 111 of input port 110). If energy storage device 140 comprises a rechargeable battery, then the linear regulator may comprise circuitry adapted to provide an optimal charging sequence according to the battery's particular chemistry. The implementation of coupling circuit 150 shown in FIG. 5 is suitable for cases where energy storage device 140 comprises a non-rechargeable battery. The implementation allows current to flow from device 140 to the input of switching power supply 130, but does readily allow current to flow from input port 110 to device 140.

Figure 6:
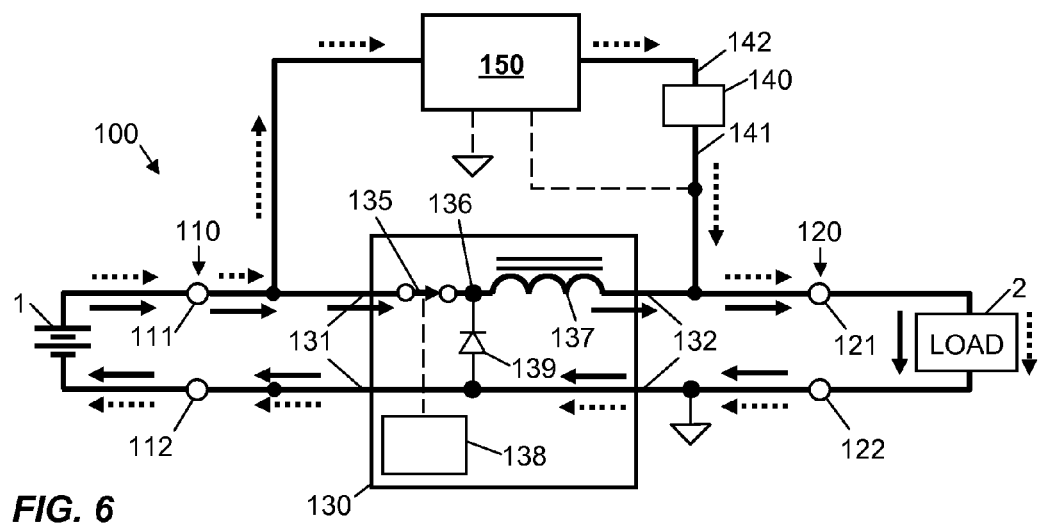
FIG. 6 illustrates first and second operating current loops of the exemplary power supply shown in FIG. 1 according to the present invention when input power is coupled to the input port.

Various operating current loops of power supply 100 are now described with respect to FIGS. 6-9 to illustrate the advantages of the present invention. For the sake of visual clarity in the drawings, and without loss of generality, current-sensing element 133 has been omitted from the drawings, but it would be apparent to one of ordinary skill in the art how to include it. FIG. 6 illustrates first and second operating current loops of power supply 100 that occur when input power is coupled to input port 110, and switch 135 is operated to couple input power to energy storage element 137 (i.e., switch 135 placed in a conductive state). Both current loops are illustrated with the lead lines of the circuit elements shown with heavy thickness, and both loops cover all of the circuit elements except for rectifier 139, which is in a non-conducting state. The first operating current loop goes from battery 1 to coupling circuit 150, then to energy storage device 140, then to load 2, and then returns to battery 1 along the second terminals 112 and 122 of ports 110 and 120 respectively. This current loop charges up energy storage device 140 through coupling circuit 150 and load 2. The first operating current loop is further illustrated with dashed arrow symbols showing the direction of current flow through these elements. The second operating current loop goes from battery 1 to switch 135, then to energy storage element 137, then to load 2, and then returns to battery 1 along the same path, terminals 112 and 122. This current loop couples power to energy storage element 137 by way of switch 135 and load 2 (so that some energy is stored in element 137), and also provides power to load 2. The second operating current loop is further illustrated with solid arrow symbols showing the direction of current flow through these elements.

Figure 7:
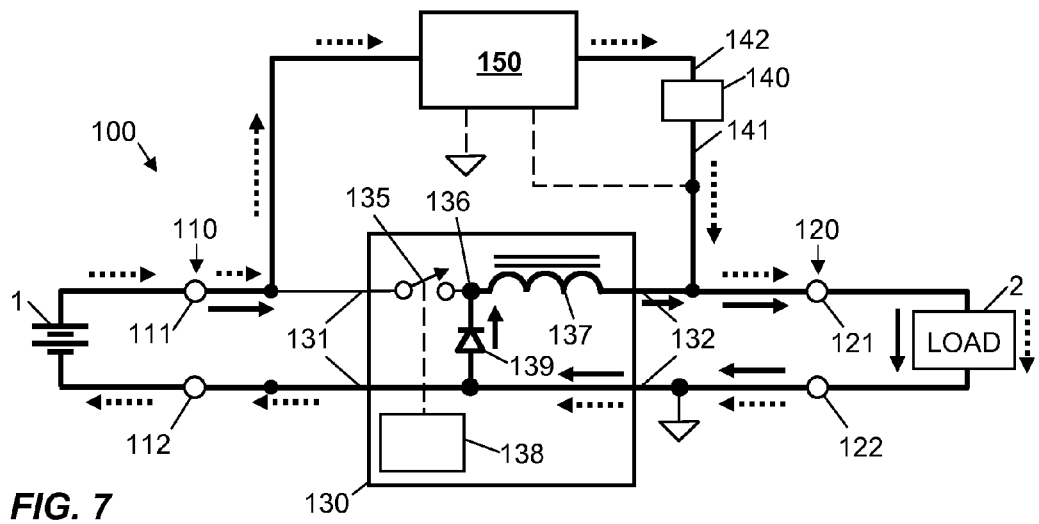
FIG. 7 illustrates the first operating current loop and a third operating current loop of the exemplary power supply shown in FIG. 1 according to the present invention when input power is coupled to the input port of the power supply.

FIG. 7 illustrates the aforementioned first operating current loop and a third operating current loop of power supply 100 that occur when input power is coupled to input port 110, and switch 135 is operated to decouple input power from energy storage element 137 (i.e., switch 135 placed in a non-conductive state). Both current loops are illustrated with the lead lines of the circuit elements shown with heavy thickness, and both loops cover all of the circuit elements except for switch 135, which is in a non-conducting state. The third operating current loop goes from energy storage element 137 to load 2, and then to rectifier 139, and then returns to energy storage element 137. The third current loop couples power from energy storage element 137 to load 2 by way of rectifier 139. The third operating current loop is further illustrated with solid arrow symbols showing the direction of current flow through these elements. The second and third operating current loops are alternated in activity according to the duty cycle of switch 135 as part of regulating the delivery of power to load 2, during the time that input power (e.g., battery 1) is coupled to input port 110. The time durations that the second and third operating current loops are active are adjusted (through the duty cycle of switch 135) to regulate the amount of power delivered to load 2 so as to control the voltage, current, and/or power delivered to load 2.

Figure 8:
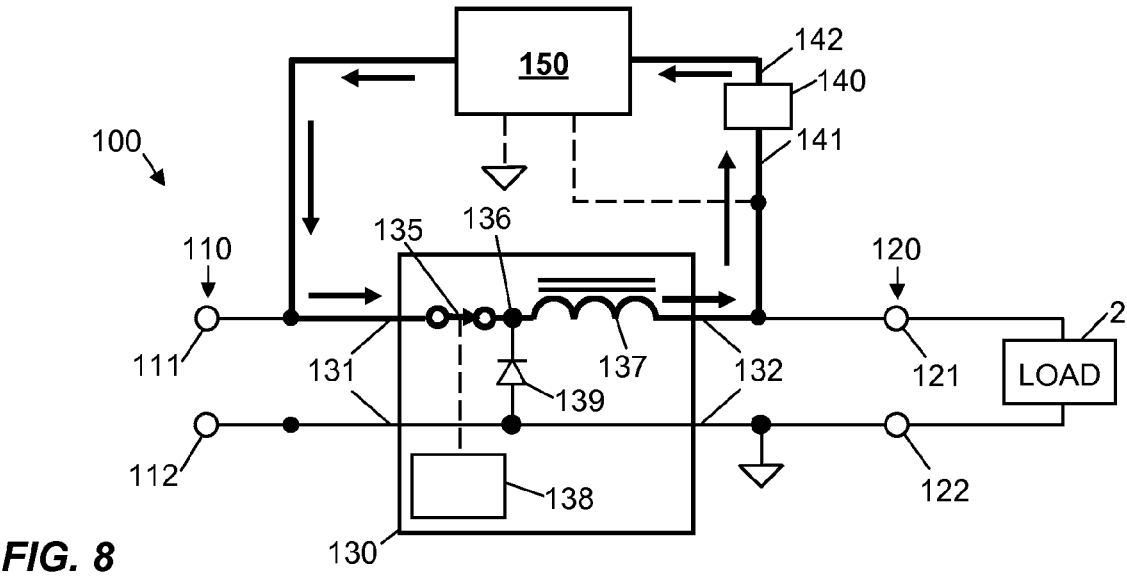
FIGS. 8 and 9 illustrate, respectively, fourth and fifth operating current loops of the exemplary power supply shown in FIG. 1 according to the present invention when input power is decoupled from the input port of the power supply.
Figure 9:
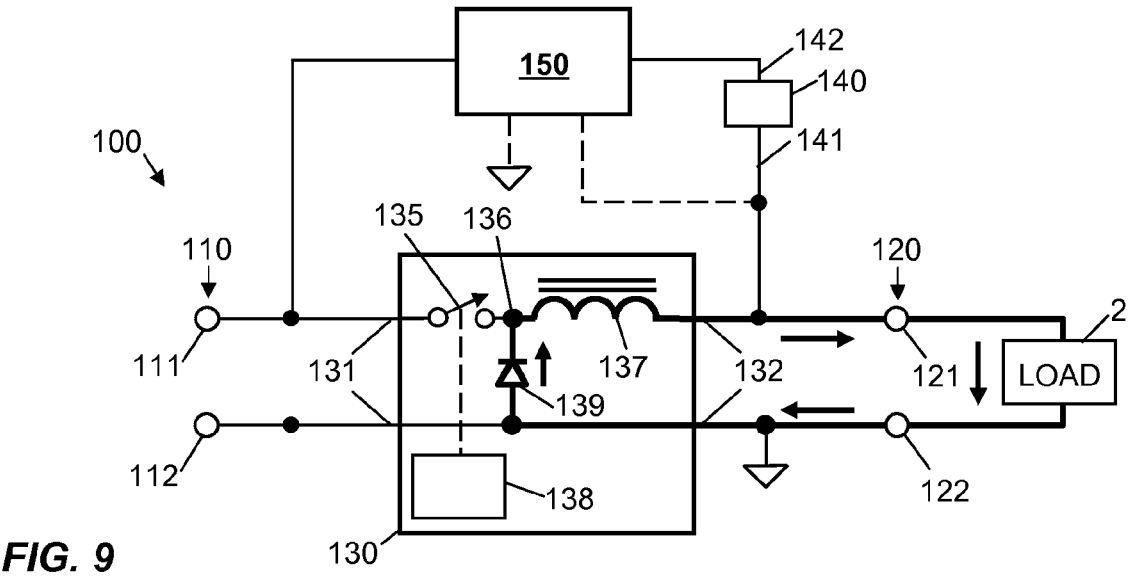

FIGS. 8 and 9 illustrate, respectively, fourth and fifth operating current loops of the exemplary power supply shown in FIG. 1 according to the present invention when input power (e.g., battery 1) is decoupled from input port 110 of power supply 100. Both current loops are illustrated with the lead lines of the circuit elements shown with heavy thickness. Referring to FIG. 8, the fourth operating current loop goes from energy storage device 140 to coupling circuit 150, then to switch 135, then to energy storage element 137, and then returns to energy storage device 140 at the connection point between the energy storage device's first terminal 141 and the output terminal of storage element 137. The fourth current loop couples power from energy storage device 140 to energy storage element 137 by way of coupling circuit 150 and switch 135 (so that energy is transferred from energy storage device 140 to element 137). The fourth operating current loop is further illustrated with solid arrow symbols showing the direction of current flow through these elements. As a difference with the second operating current loop, the fourth operating current loop does not provide power to load 2.

Referring to FIG. 9, the fifth operating current loop goes from energy storage element 137 to load 2, and then to rectifier 139, and then returns to energy storage element 137. The fifth current loop couples power from energy storage element 137 to load 2 by way of rectifier 139. The fifth operating current loop is further illustrated with solid arrow symbols showing the direction of current flow through these elements. The operating fifth current loop involves the same circuit elements as the third operating current loop. The fourth and fifth operating current loops are alternated in activity according to the duty cycle of switch 135 as part of regulating the delivery of power to load 2, during the time that input power (e.g., battery 1) is not coupled to input port 110. The time durations that the fourth and fifth operating current loops are active are adjusted (through the duty cycle of switch 135) to regulate the amount of power delivered to load 2 so as to control the voltage, current, and/or power delivered to load 2. The fifth current loop is similar to the third current loop, but may have a different time duration of activity so as to compensate for the lack of power delivery to load 2 by the fourth current loop.

Energy storage device 140 may comprise a super-capacitor (also known as an ultra-capacitor). Super-capacitors have energy storage densities equal to or greater than 0.5 Watt-hour per kilogram (Wh/kg). Super-capacitors from Maxwell Technologies currently have energy densities in the range of 1 Wh/kg to 6 Wh/kg, and the next generation super-capacitors using nanotechnology have achieved energy densities in the range of 30 Wh/kg to 60 Wh/kg. A conventional super-capacitor comprises a positive plate, a negative plate, a separator disposed between the two plates, and an electrolyte disposed between the separator and each plate. The positive plate attracts negative ions in the electrolyte, and the negative plate attracts positive ions in the electrolyte. As a result, there are two layers of capacitive storage coupled in series. This structure is sometimes referred to as an electrochemical double-layer capacitor (EDLC). While super-capacitors have high energy storage densities compared to conventional capacitors, they have relatively low breakdown voltages (i.e., low maximum voltage ratings), on the order of 2.5 V to 5 V. However, the topology of power supply 100 enables these capacitors with low-breakdown voltage to be used for energy storage device 140 since the interconnection of energy storage device 140 between the input port 110 and output port 120 through charging circuit 150, as described above, reduces the potential difference across the capacitor compared to the conventional case of coupling the capacitor across input port 110.

As a further advantage, the aforementioned interconnection of energy storage device 140 enables switching power supply 130 to operate and regulate the voltage, current, and/or power to the output port 120 to desired target value(s) when input power is decoupled from input port 110. (See the above description of the fourth and fifth operating current loops.) While an output capacitor coupled in parallel with output port 120 could maintain the output voltage across load 2 for a short amount of time, it would lose its effectiveness for doing so in computer applications once its voltage fell below ~90% of the target output voltage, which corresponds to the typical 10% tolerance band required by most conventional computer loads 2. (A conventional computer load 2 typically shuts down when the voltage it receives falls below 90% of the target value.) When the voltage across such an output capacitor falls to 90% of its target value, it still has 81% of the amount of energy initially stored in the capacitor before the input power was removed (Stored Energy=$0.5*C*V^2$). Thus, the output capacitor is not fully utilized to maintain the voltage at the output when input power is removed. In contrast, a capacitor implementation of energy storage device 140 can provide power to switching power supply 130 until it is nearly depleted of charge (e.g., near 96% depleted, as explained below), and thus can reach to near 100% utilization.

Also in comparison, an input capacitor coupled in parallel with input port 110 could not have its stored energy fully utilized either. This is because, after the input power (e.g., battery 1) is removed, the voltage across the input capacitor begins to fall. For a theoretical, ideal buck converter, once the input voltage drains down to the level of the output voltage, the switching power supply 130 cannot operate any more (because current will begin to flow backwards in storage element 137). The typical, less than ideal buck converters stop sooner when the input voltage is still perhaps 1 volt higher than the output. Consider a specific switching power supply with 3.3V output and the input capacitor, being a super-capacitor, is limited to 5V. If the input must remain at least 1.0V higher than the output, the super-capacitor is useful only while it is draining down to 4.3V when ~74% of the energy ($4.3V^2/5.0V^2$) still remains in the capacitor, and thus the input capacitor is only 26% utilized. In contrast, the configuration of a capacitor implementation of energy storage device 140 and coupling circuit 150 enable almost all (96%) of the energy stored in the capacitor to be utilized to maintain the operation of power supply 100 as only 4% ($1V^2/5.0V^2$) is left unused when input power is removed. So the utilization of the super-capacitors is much higher in this application.

Figure 10:
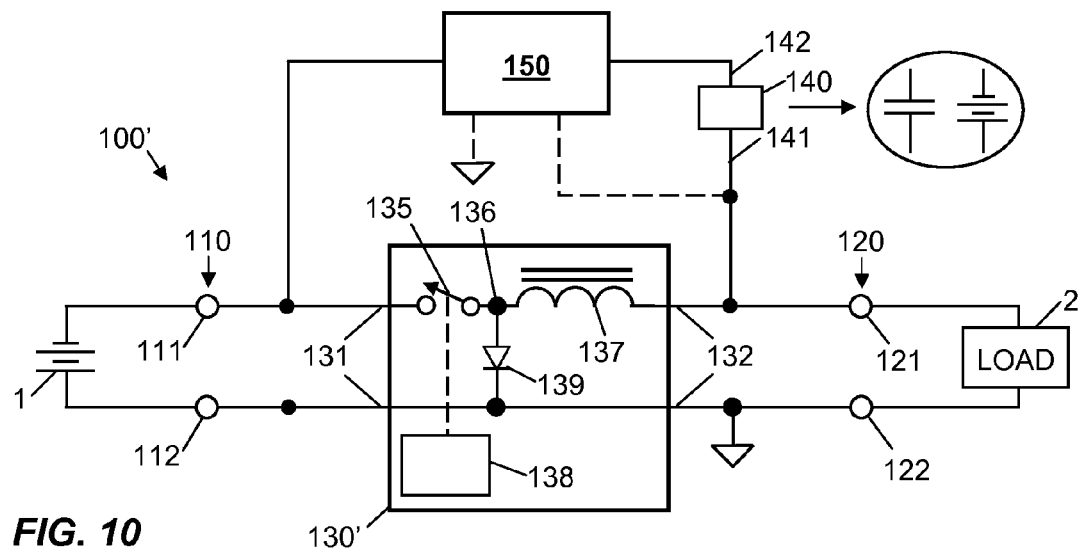
FIGS. 10 and 11 show additional exemplary power supplies according to the present invention.

Aspects of the present invention have been illustrated with a power supply 100 that provides a positive output voltage at terminal 121 of output port 120 with respect to the common ground at terminals 112 and 122. It may be appreciated that aspects of the invention may be equally applied to power supplies that provide a negative output voltage, as illustrated by power supply 100' shown in FIG. 10. Power supply 100' comprises a modified switching power supply 130', which has the same components as supply 130 but with a reversed orientation for rectifier 139. (That is, the direction of forward-biased current flow is outward from node 136 in supply 130', whereas the direction is inward to node 136 for supply 130.) As another difference, the polarity of battery 1 is reversed for power supply 100', with a negative voltage being supplied to first terminal 111 of input port 110 instead of a positive voltage. However, just as in power supply 100, the circuit combination of energy storage device 140 and coupling circuit 150 is coupled between the first terminal 111 of input port 110 and the selected node, which can be the node that couples switching power supply 130' to the first node 121 of output port 120. The potential difference between the input port's first terminal 111 and this circuit node is smaller than, but with the same polarity as, the potential difference between the input port's first and second terminals 111 and 112, respectively. (The potential at terminals 112 and 122 is at zero, whereas the potential at terminal 111 may be set at −12V and the potential at terminal 121 may be set at −5V, yielding a potential difference between terminals 111 and 121 of −7V, which is smaller than, but with the same polarity, as the potential different between terminals 111 and 112, which is −12V).

Figure 11:
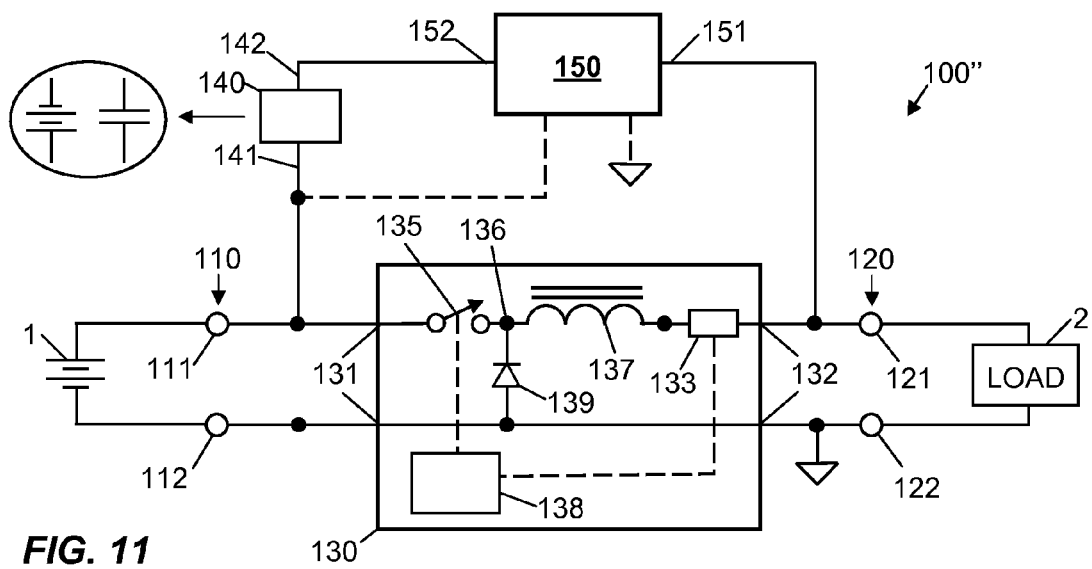

Power supply 100" shown in FIG. 11 has been previously described. It shows where the positions of energy storage device 140 and coupling circuit 150 may be exchanged.

Figure 12:
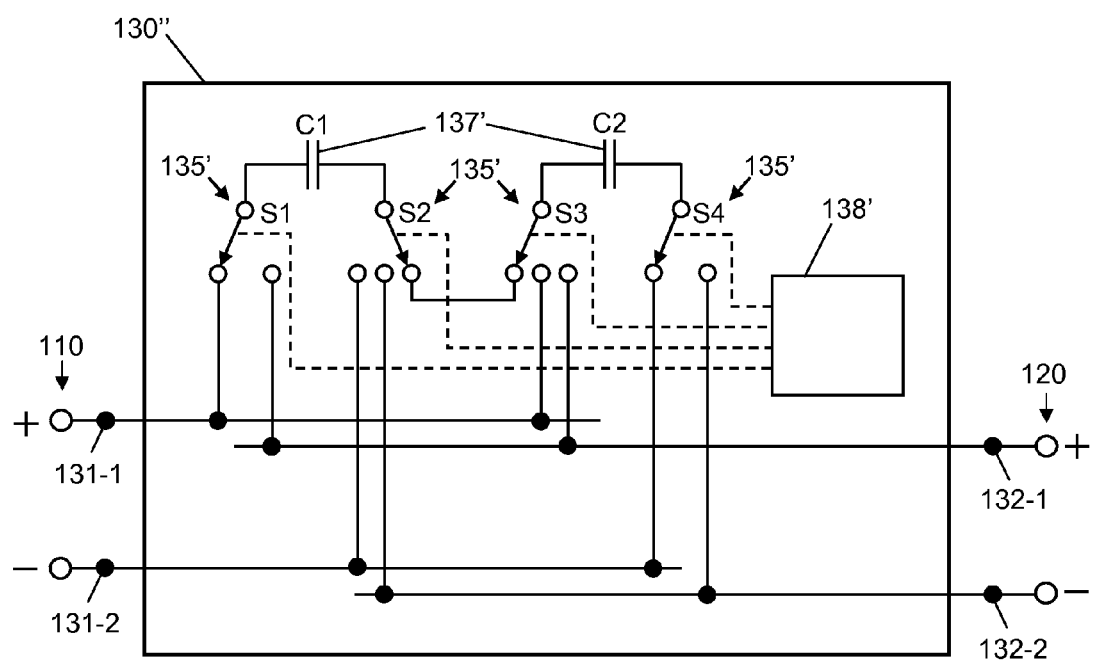
FIG. 12 shows another exemplary switching power supply according to the present invention.

While the above description has illustrated switching power supply 130 where energy storage element 137 comprises an inductor, it may be appreciated that energy storage element 137 may comprise a capacitor, as illustrated by the switched-capacitor implementation 130" of the power supply shown in FIG. 12. Switching power supply 130" comprises an energy storage element 137' having capacitors C1 and C2, a bank 135' of four switches S1-S4, each switching being coupled to a respective terminal of one of the two capacitors C1 and C2, and a controller 138' that switches the free terminals of the switches among various input terminals 131-1 and 131-2 and output terminals 132-1 and 132-2. The topology shown in FIG. 12 is common and well known, as are the various switching sequences used to transfer power from the input terminals to the output terminals. One sequence can perform a ~50% reduction in voltage between input and output. Another sequence can perform an approximate doubling of the voltage (100% increase) between input and output. And yet another sequence can perform a direct translation of voltage between input and output. To do each of the conversions, the switches are successively alternated between two switch configurations at a high frequency. For a 50% reduction, the first switch configuration couples capacitors C1 and C2 in series, and further couples the series combination in parallel with the input terminals, whereas the second switch configuration couples each of the capacitors in parallel with the output terminals. For a doubling of the voltage, the first switch configuration couples each of capacitors C1 and C2 in parallel with the input terminals, and the second switch configuration couples the capacitors in series, and further couples the series combination in parallel with the output terminals. For a direct transfer, each capacitor is simply alternatively switched between the input terminals and the output terminals. To provide for similar current loops as those shown in FIGS. 6-9, input terminal 131-2 and output terminal 132-2 may be electrically coupled to one another to provide a common ground. Switching power supply 130" may be operating in the 50% reduction mode when input power is provided to the input of power supply 100. When input power is removed and power is needed from energy storage device 140, switching power supply 130" may initially continue with the 50% reduction mode, but may subsequently switch to direct transfer mode as energy storage device 140 depletes (such as when it comprises a capacitor), and may thereafter subsequently switch to doubling mode as device 140 depletes further. Designs of controllers 138' for performing the changing of these modes according to the sensed input voltage are known to the art, and may be implemented by one of ordinary skill in the art without undue experimentation.

The above description is illustrative and is not restrictive. Many variations of the invention and embodiments thereof will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A power supply comprising:
    an input port to receive a source of input power, the input port having a first terminal and a second terminal;
    an output port to provide output power, the output port having a first terminal and a second terminal;
    a switching power supply having an input coupled to the input port to receive input power and an output coupled to the output port to provide output power;
    a selected circuit node having a potential, wherein, when input power is provided to the input port, the potential difference between the first terminal of the input port and the selected circuit node has the same polarity as the potential difference between the first and second terminals of the input port, but is less in magnitude; and
    a circuit combination of a coupling circuit and an energy storage device, a first terminal of the circuit combination being coupled to the first terminal of the input port, and a second terminal of the circuit combination being coupled to the selected circuit node, the circuit combination being configured to couple energy from the energy storage device to the input of the switching power supply when input power is not provided at the input port.

2. The power supply of claim 1, wherein the circuit combination is further configured to couple energy from the input port to the energy storage device when input power is provided at the input port.

3. The power supply of claim 1, wherein the energy storage device comprises a capacitor.

4. The power supply of claim 1, wherein the energy storage device comprises a battery.

5. The power supply of claim 1, wherein the selected circuit node is the output of the switching power supply.

6. The power supply of claim 1, wherein the coupling circuit comprises a first electrical connection between a first terminal of the energy storage device and the selected circuit node and a second electrical connection between a second terminal of the energy storage device and the first terminal of the input port.

7. The power supply of claim 1, wherein the coupling circuit comprises one or more resistors.

8. The power supply of claim 1, wherein the coupling circuit comprises one or more electrical components that allow the energy storage device to store energy from the input port when input power is provided and to release energy back to the input port when input power is not provided.

9. The power supply of claim 1, wherein the coupling circuit comprises one or more inductors.

10. The power supply of claim 1, wherein the switching power supply further comprises at least one switch and at least one energy storage element, and wherein the switching power supply repeatedly switches the at least one switch between a conducting state and non-conducting state when power is provided to its input, causing energy from the input port to be repeatedly stored into the energy storage element, and energy from the energy storage element to be repeatedly coupled to the output port.

11. The power supply of claim 10, wherein the energy storage element comprises an inductor or a capacitor.

12. The power supply of claim 1, wherein the switching power supply comprises a buck converter.

13. A power supply comprising:
    an input port to receive a source of input power, the input port having a first terminal and a second terminal;
    an output port to provide output power, the output port having a first terminal and a second terminal;
    a switching power supply having an input coupled to the input port to receive input power, an output coupled to the output port to provide output power, and at least one switch, the switching power supply providing a common connection between the second terminal of the input port and the second terminal of the output port, the switching power supply repeatedly switching the at least one switch between a conducting state and non-conducting state when power is provided to its input; and
    a circuit combination of a coupling circuit and an energy storage device, a first terminal of the circuit combination being coupled to the first terminal of the input port, and a second terminal of the circuit combination being coupled to the first terminal of the output port, the circuit combination being configured to couple energy from the energy storage device to the input of the switching power supply when input power is not provided at the input port.

14. The power supply of claim 13, wherein the circuit combination is further configured to couple energy from the input port to the energy storage device when input power is provided at the input port.

15. The power supply of claim 13, wherein the energy storage device comprises a capacitor.

16. The power supply of claim 13, wherein the energy storage device comprises a battery.

17. The power supply of claim 13, wherein the coupling circuit comprises a first electrical connection between a first terminal of the energy storage device and the first terminal of the output port and a second electrical connection between a second terminal of the energy storage device and the first terminal of the input port.

18. The power supply of claim 13, wherein the coupling circuit comprises one or more resistors.

19. The power supply of claim 13, wherein the coupling circuit comprises one or more electrical components that allow the energy storage device to store energy from the input port when input power is provided and to release energy back to the input port when input power is not provided.

20. The power supply of claim 13, wherein the coupling circuit comprises one or more inductors.

21. The power supply of claim 13, wherein the switching power supply further comprises at least one energy storage element, and wherein the switching of the at least one switch between a conducting state and non-conducting state causes energy from the input port to be repeatedly stored into the energy storage element, and energy from the energy storage element to be repeatedly coupled to the output port.

22. The power supply of claim 21, wherein the energy storage element comprises an inductor or a capacitor.

23. The power supply of claim 13, wherein the switching power supply comprises a buck converter.

24. The power supply of claim 1, wherein the coupling circuit comprises one or more diodes.

25. The power supply of claim 1, wherein the coupling circuit comprises a linear regulator.

26. The power supply of claim 25, wherein the linear regulator compares the voltage across the energy storage device to a reference voltage, and regulates the current flow from the input port to the energy storage device to maintain the voltage across energy storage device to a value set by the reference voltage.

27. The power supply of claim 1, wherein the coupling circuit comprises one or more semiconductor devices.

28. The power supply of claim 1, wherein the coupling circuit further comprises a semiconductor device coupled between the first terminal of the input port and a terminal of the energy storage device and configured to provide a discharge path when the input power source is removed.

29. The power supply of claim 13, wherein the coupling circuit comprises one or more diodes.

30. The power supply of claim 13, wherein the coupling circuit comprises a linear regulator.

31. The power supply of claim 30, wherein the linear regulator compares the voltage across the energy storage device to a reference voltage, and regulates the current flow from the input port to the energy storage device to maintain the voltage across the energy storage device to a value set by the reference voltage.

32. The power supply of claim 13, wherein the coupling circuit comprises one or more semiconductor devices.

33. The power supply of claim 13, wherein the coupling circuit further comprises a semiconductor device coupled between the first terminal of the input port and a terminal of the energy storage device and configured to provide a discharge path when the input power source is removed.

* * * * *